United States Patent
Tan et al.

(10) Patent No.: US 6,882,490 B1
(45) Date of Patent: Apr. 19, 2005

(54) SYSTEM FOR PROTECTION AGAINST COPYING ON MAGNETIC TAPE RECORDERS

(75) Inventors: Baolin Tan, Cambridgeshire (GB); Abdul-Hamed Mazen Abdin, Cambridgeshire (GB)

(73) Assignee: Dwight Cavendish Systems Limited, Hertfordshire (GB)

( * ) Notice: Subject to any disclaimer, the term of this patent is extended or adjusted under 35 U.S.C. 154(b) by 0 days.

(21) Appl. No.: 09/958,611

(22) PCT Filed: Apr. 7, 2000

(86) PCT No.: PCT/GB00/01314

§ 371 (c)(1),
(2), (4) Date: Dec. 18, 2001

(87) PCT Pub. No.: WO00/62291

PCT Pub. Date: Oct. 19, 2000

(30) Foreign Application Priority Data

Apr. 9, 1999 (GB) .............................................. 9908168

(51) Int. Cl.⁷ ............................................... G11B 15/04
(52) U.S. Cl. .............................. 360/60; 360/27; 360/15; 360/78.02; 360/78.03
(58) Field of Search .............................. 360/15, 16, 17, 360/29, 28, 60, 27, 69, 55, 62, 78.02, 78.03; 380/2, 41, 201, 203; 375/240–242

(56) References Cited

U.S. PATENT DOCUMENTS

| | | | | |
|---|---|---|---|---|
| 4,086,634 A | * | 4/1978 | Cook | 705/58 |
| 4,644,422 A | * | 2/1987 | Bedini | 360/60 |
| 5,161,210 A | * | 11/1992 | Druyvesteyn et al. | 704/200 |
| 5,394,274 A | * | 2/1995 | Kahn | 360/27 |
| 5,513,260 A | * | 4/1996 | Ryan | 380/200 |
| 5,822,360 A | * | 10/1998 | Lee et al. | 375/140 |

* cited by examiner

*Primary Examiner*—Sinh Tran
*Assistant Examiner*—Natalia Figueroa
(74) *Attorney, Agent, or Firm*—Flynn, Thiel, Boutell & Tanis, P.C.

(57) ABSTRACT

An audio or other program signal is modified to provide protection against copying on a magnetic tape recorder. The signal from a source (10) is amplified (16) and then subjected to Fourier analysis (11) to determine the signal amplitude in a plurality of subbands across the audible range. The subband containing the component of greatest magnitude is selected on an adaptive basis and applied to a stored psycho-sensorial model (12), which determines the maximum amplitude of interference which can be masked by the selected subband. An anti-copy signal is generated (14) by complex division of the desired interference by a stored representation of the response of a tape recorder (13).

31 Claims, 4 Drawing Sheets

(a)

(b)

SYSTEM FOR PROTECTION AGAINST COPYING ON MAGNETIC TAPE RECORDERS

BACKGROUND OF THE INVENTION

This invention relates to a system for protection against copying on magnetic tape recorders. The expression "tape recorder" here includes both audio and video tape recorders.

Music artistes and other owners of copyright works have been plagued by unauthorised copying of their work. For example much music and other audio programme material is now available recorded on compact discs (CDs) and is nevertheless readily copied by the use of a simple commercially-available analogue cassette tape recorder. The same is true for other recording formats as well as for broadcast programme material, both in audio and video form.

Attempts have been made to render recordings such as CDs uncopyable. Generally these have involved recording on the CD an additional tone which is outside the range of audible frequencies but which nevertheless interferes with the high frequency bias oscillator frequency of the tape recording head in the tape recorder, thereby creating distortion in the tape recording which is unpleasant to listen to when it is replayed. The additional tone may be a low-frequency tone below the audible range or may be a high frequency tone above the audible range.

For example, U.S. Pat. No. 4,086,634 describes a system in which a high-frequency signal outside the normal hearing range is frequency modulated onto the original signal co be recorded. When an attempt is made to copy the recorded material onto magnetic tape, detectable interference signals, such as beat signals and cross-modulation signals, are said to arise between the recorded modulation signal and the copying tape recorder's recording bias. These interference signals will arise at least in part within the audible range and will ruin the replay of the recorded tape. Nevertheless the original recording can be replayed without degradation. In this US patent, the superimposed signal is applied in portions of the original signal where the original signal has at least a predetermined magnitude. The superimposed signal preferably varies in a predetermined manner so as to sweep cyclically over a selected spectrum of frequencies.

U.S. Pat. No. 5,822,360 describes a system for transporting auxiliary data in a conventional audio signal. The auxiliary data is hidden in the audio signal in the form of coloured noise.

The data to be transported is first converted to a spread spectrum signal. The primary audio signal is analysed to determine its spectral shape. The same spectral shape is imparted to the spread spectrum signal, which is then combined with the primary audio signal for transmission.

Another system is described in U.S. Pat. No. 4,644,422 in which an interfering signal is added to the original recording, the interfering signal in one example being the output of a pulse width modulator which is combined with the source only when a selected parameter, notably the frequency, of the source signal, exceeds a specified threshold frequency.

Other proposals have been made in French Patent Application FR-A-2 740 897 and U.S. Pat. No. 5,523,853.

In practice it has been difficult to make such a system work effectively. The constraints on the system are substantial; the added signal has to destroy the recorded material when it is re-recorded on a tape recorder sufficiently to render it unplayable so far as the listener is concerned, while not causing any noticeable deterioration in the high-quality original recording when that is replayed. All this has to be achieved using conventional unadapted CD players and without any modification having to be made to commercially available tape recorders.

We have found that various problems arise with existing proposed systems. For example, the signal-to-noise ratio (S/N) can be deleteriously reduced, due to the addition of a continuous anti-copy signal. Some systems can have the effect of reducing the dynamic range of the audio signal due to the anti-copy signal. For certain kinds of signals, some systems have the results that either the original recordings do not play well, or the effectiveness of stopping re-recording is insufficient. The playability of the recording can be poor. Finally, some systems have the effect of increasing the power consumption of the player of the original recording causing heating in the power transistors and speakers.

While described in the context of CDs, similar problems arise with other programme material, such as video recordings or sound and/or vision broadcasts. In the field of audio, recordings can include music of various types, speech, song and periods of silence.

SUMMARY OF THE INVENTION

The invention in its various aspects is defined in the independent claims below, to which reference should now be made. Advantageous features are set forth in the appendant claims.

A preferred embodiment of the invention is described below by way of example with reference to the drawings. In this embodiment an audio or other programme signal is modified to provide protection against copying on magnetic tape recorders, in this example an audio tape recorder. The signal from a source is amplified and then subjected to Fourier analysis to determine a frequency-dependent characteristic of the signal, namely the signal amplitude in a plurality of subbands across the audible range. The subband containing the component of greatest magnitude is selected on an adaptive basis and applied to a stored psycho-sensorial model, which determines the maximum amplitude of interference which can be masked by the selected subband. An anti-copy signal is generated by complex division of the desired interference by a stored representation of the response of typical tape recorders.

The system can be applied to CDs, or to other source material, including DAT, satellite or cable transmissions, radio, material from the internet, video-CD, DVD, VCD, and DVC players.

BRIEF DESCRIPTION OF THE DRAWINGS

The invention will now be described in more detail by way of example with reference to the drawings, in which.

DETAILED DESCRIPTION OF THE PREFERRED EMBODIMENT

Figure 1:
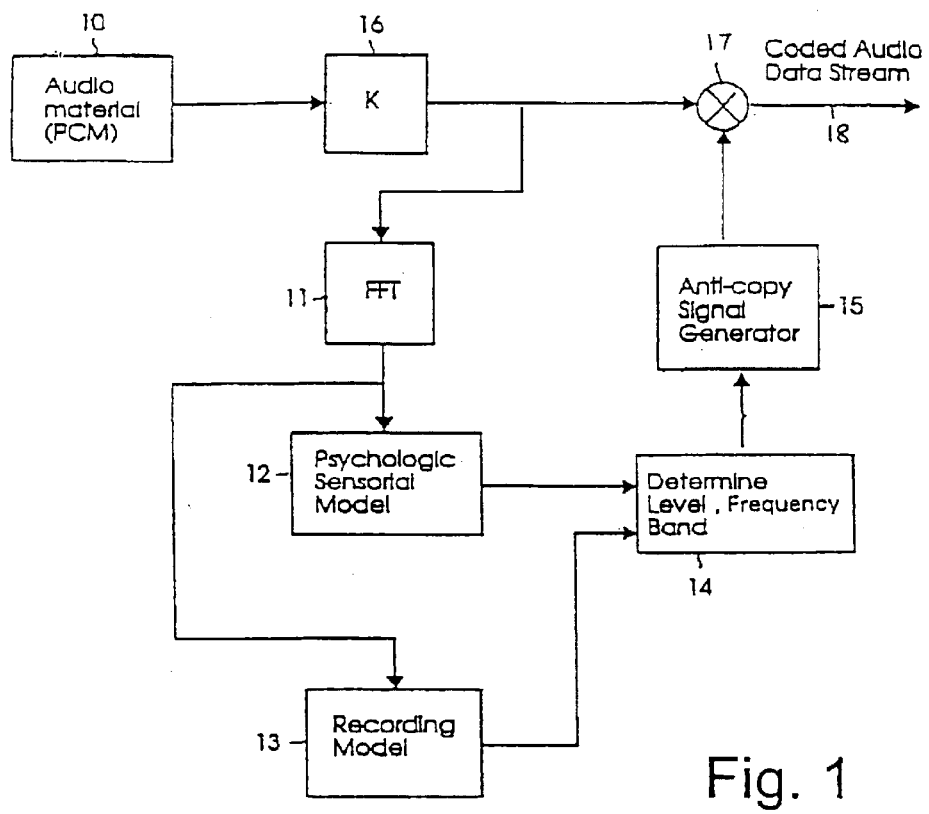
FIG. 1 is a block circuit diagram of an anti-copy system embodying the invention.

A system for recording audio CDs such that they include an anti-copy signal is illustrated in FIG. 1. The audio material to be recorded on the CD is played from an audio material source 10 where it is conveniently recorded digitally in PCM (pulse code modulated) form. An amplifier 16 is connected to receive the audio signal from the source and apply a gain of value K which is determined to bring the signal amplitude to a desired range. The audio signal is then passed to an adder 17 where the anti-copy signal is added to it, and thence to an output 18 which provides the coded audio data stream.

In order to generate the anti-copy signal, a fast Fourier transform (FFT) circuit 11 is also connected to the output of the amplifier 16 to receive the amplified audio signal. The fast Fourier transform circuit is of well-known and readily-available type and provides a temporal-to-frequency transformation on the signal. Thus the output of the FFT circuit 11 represents the frequency spectrum of the audio signal. As an alternative to an FFT circuit, the transform may be implemented in software. Other transforms could be used in place of the FFT, but the FFT is convenient as implementations of it are readily available. Connected to the output of the FFT circuit are both a circuit 12 which represents a psychologic sensorial model, as described below, and a circuit 13 representing a recording model or models, that is models of a typical generalised tape recorder, again described more fully below. The outputs of the circuits 12 and 13 are combined in a circuit 14 to determine the signal level and the frequency band of the anti-copy signal. The amplitude and frequency outputs of the circuit 14 are then applied to an anti-copy signal generator 15, the output of which is applied to the other input of the adder 17 as the anti-copy or interfering signal. The output signal at 18 thus consists of the sum of the original audio signal with the anti-copy signal. The circuits 12, 13, and 14 have been described as discrete circuits but in practice may be implemented in software which runs on a micro-processor.

Figure 2:
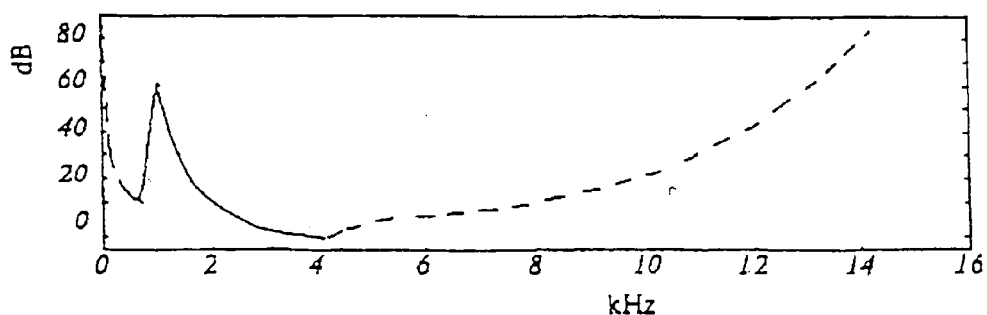
FIG. 2 is a curve showing the masking effect of a 1000 Hz tone.

Broadly, the system operates by adding to the audio signal an anti-copy signal which is adaptively and controllably dependent upon the signal content at any given moment. To do this it first analyses the audio signal to determine the signal amplitude in each of a plurality of frequency subbands covering the audible range. This is achieved by the FFT circuit 11. It then determines a selected one of the subbands, which for the moment may be assumed to be the subband where the audio signal has the greatest amplitude. Once this subband is known, it is then possible to determine from a stored psychologic sensorial model in circuit 12 what is the maximum signal amplitude that can be added to the signal at any given frequency without it being audible. A typical model is illustrated in FIG. 2, described below.

For each subband, a desired interfering noise has previously been determined empirically. That is to say, for each subband, a noise frequency range has been determined which provides strong interference with the audio signal. For instance, for the subband at about 7 KHz, the subjectively most effective interference may be at around 1 KHz. For other subbands the frequencies will be different. For example for a subband at a low frequency of around 80 Hz, an interfering frequency of about 1.5 KHz could be chosen. Finally, as another example, for a subband at around 15 MHz, a relatively high frequency, the interfering signal could be at say 3 KHz. Thus it is seen that the interfering frequency may be above or below the subband in question, and will generally be in the range 500 Hz to 5 KHz.

Assuming that the subband at 7 KHz is dominant, the system now knows that it has to generate interference at around 1 KHz. However, adding an interfering signal of 1 KHz to the signal will not provide a noise signal of 1 KHz, because the noise is produced by beating and cross-modulation between the anti-copy signal and the high-frequency bias signal applied to the recording head of the tape recorder. The system has to determine what form of anti-copy signal to add such that a noise signal of the desired frequency, viz. 1 KHz in this example, will be recorded on the tape when a recording of the signal is made on a tape recorder. This determination is made by the circuit 14 with the help of the recording model or models contained within the circuit 13, as is described in more detail below. Once the required signal is determined, as to amplitude and frequency, these parameters are applied by the circuit 14 to the anti-copy signal generator 15 which provides the required anti-copy signal to the adder 17.

The psychologic sensorial model held in the circuit 12 will now be described in more detail with reference to FIG. 2. FIG. 2 is a known curve which shows the amount of interference which can be tolerated by a typical human being without being noticeable, in the presence of a tone of frequency 1 KHz and amplitude 60 dB. That is to say, when an inserted signal is lower than the curve in FIG. 2, the inserted signal will be masked by the original material signal, that is the 1 KHz tone, such that human hearing can not hear the inserted signal. For example, referring to FIG. 2, at frequency 10 KHz a tone of about 20 dB will not be heard, and at a frequency of 12 KHz a tone of about 40 dB will be inaudible. These tones at 10 and 20 KHz are masked by the tone at 1 KHz. Such curves are available for tones of various masking frequencies and are known and used in the signal compression field.

The FFT circuit 11 analyses the audio signal into a number of frequency subbands, as mentioned above. To do this it takes a sample of predetermined duration which may typically be about 2 seconds duration but is conveniently in the range of about 0.1 second to about 5 or 10 seconds. The output of the FFT is thus a succession of values every two seconds which represent the signal amplitude in each subband during that two-second sample period. There are typically ten subbands spread across the audio spectrum on an approximately logarithmic basis; the precise number or spacing of the bands can however be varied. One of these subbands can be selected as the subband in which the audio signal is of the greatest magnitude in the corresponding sample period.

The designer of the present system when preparing it for use in any given application makes use of the psychologic sensorial model held in circuit 12. More correctly, there are as many models of the type represented in FIG. 2 as there are subbands. For each subband, the designer chooses a frequency range for the interfering noise that the listener to an illegal recording will hear. This choice is made empirically on the basis of the frequency range where the noise is most noticeable, and can be adapted to the type of material of which the original recording consists. Ideally the designer or the system itself will conduct tests on the type of material to see which frequencies provide the best masking effect. Alternatively, a standard set of interfering frequencies may be used.

Thus in operation, the circuit 12 determines, from the subband of the audio signal which has been selected as containing components of greatest amplitude, those frequencies which are to constitute the noise frequencies in the signal as replayed from a tape recorder. It will be appreciated that in any given application the circuit 12 could be constituted simply by a look-up table, but by having a more complex implementation allows the designer to vary the noise added to the playback of an illegal copy in dependence upon the audio signal content and other factors.

It has been assumed that the selected subband is determined on the basis of the subband which contains audio signal components of greatest magnitude. However, where there are two subbands which both contain quite high amplitude components, it is possible that the psychologic sensorial models will indicate that greater noise can be tolerated with the subband which is not in fact the subband containing the components of greatest magnitude. Thus preferably the subband selected to determine the form of the anti-copy signal is the subband which allows an interfering signal of the greatest possible magnitude. This may typically be the subband with perhaps the second largest signal components.

Thus the desired noise components are now known as to amplitude and frequency. The frequency is selected in dependence upon the subband which has been identified as being the one which allows the greatest amount of noise to be introduced without it being noticeable when a legal recording is played. The designer or the system itself has determined for each of the possible selected subbands which frequencies are the most effective interference, and the amplitude can then be read off the appropriate curve of the type shown in FIG. 2.

The system now determines what the anti-copy signal needs to be in order to produce the desired interference when the audio signal with the anti-copy signal is recorded on a tape recorder. For this purpose the circuit 13 holds a generalised representation of the response of a tape recorder. This can be generated by taking several typical analogue recorders of the type with which the system is to be used and applying tones of selected frequencies to them and seeing what interference results. The optimum tone is chosen which is most effective with the majority of tape recorders. A frequency response transfer function can thus be built up which will enable the system to work with a wide range of different types of tape recorders.

If it is assumed that:

$D(j\omega)$ is the Fourier or frequency-domain representation of the desired anti-copy signal to be generated by the circuit of FIG. 1;

$N(j\omega)$ is the Fourier or frequency-domain representation of the desired noise to be produced on replay of an illegally-copied tape; and $R(j\omega)$ is the Fourier or frequency-domain representation of the tape recorder response; then:

$$N(j\omega)=D(j\omega).R(j\omega)$$

Re-arranging this;

$$D(j\omega)=N(j\omega)/R(j\omega).$$

Thus, since the desired noise and the recorder response are both known, the required anti-copy signal can be determined.

This is achieved by circuit 14 which effects the complex division just described to give a representation of the frequency and amplitude of the anti-copy signal which is necessary to produce the required noise signal when an illegal recording is replayed. The circuit 14 provides at its output two values representative respectively of the frequency and amplitude of the anti-copy signal. The signal generator 15 generates the anti-copy signal in accordance with these instructions.

As described above, the distortion takes the form of an interfering signal extending over a portion of the spectrum, as chosen by the system designer or the system itself. It could take the form of a sort of white noise signal for example. The manner in which the interference is generated, however, lends itself to the generation of specific forms of distortion. For example, the distortion can take the form of a verbal message, such as "This is an illegal recording". To produce distortion in this form, all that is necessary is to convert the output from the circuit 12 in FIG. 1 to a recording of the desired message. The circuit 14 will convert this to an anti-copy signal which will have the effect of regenerating the message.

Figure 3:
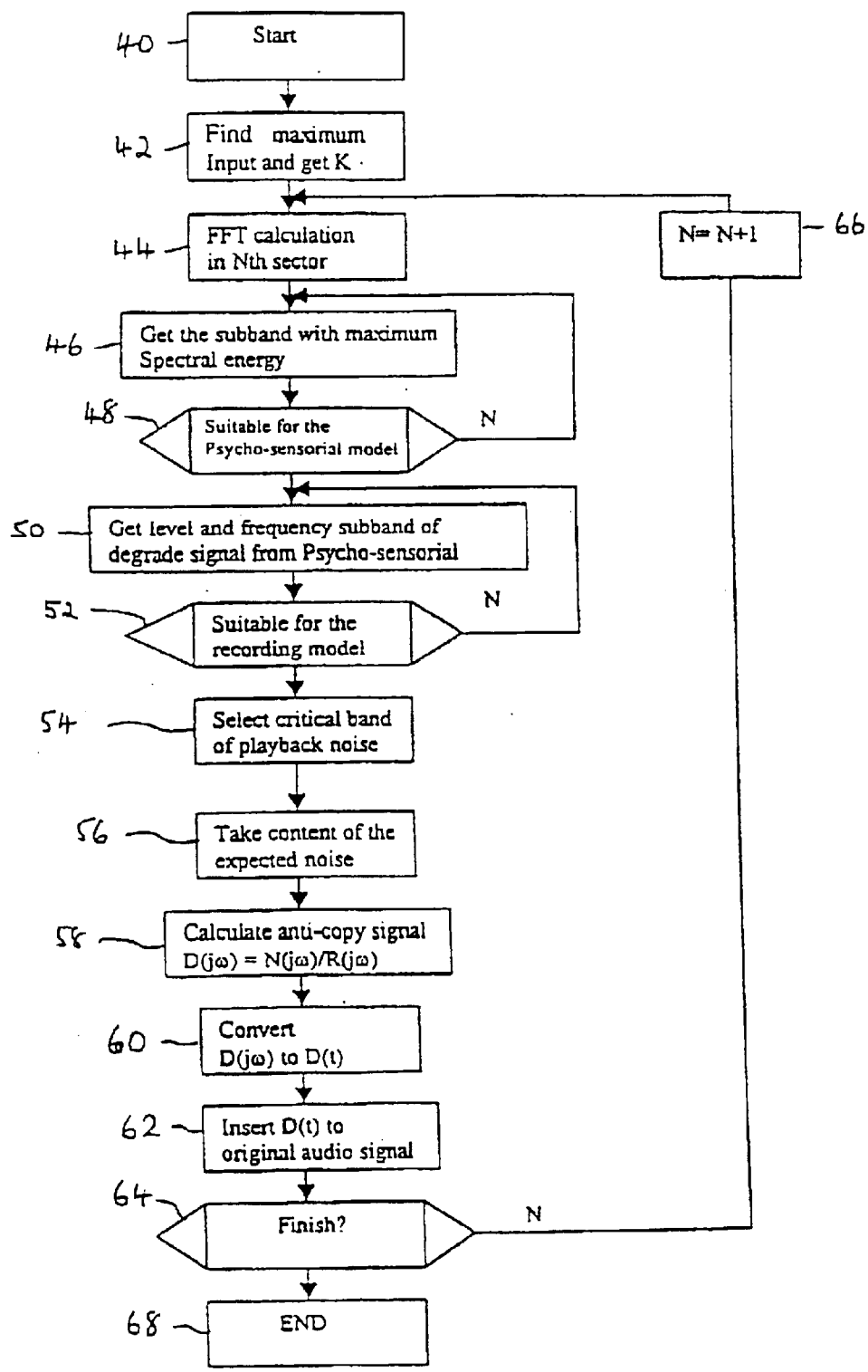
FIG. 3 is a flowchart illustrating the operation of the system of FIG. 1.

A software implementation of the system as represented by the blocks 12, 13 and 14 in FIG. 1 will now be described with reference to the flowchart of FIG. 3. The routine starts at 40 and at step 42 the maximum input is determined. This may also be part of the operation that set the value of the gain K of the amplifier 16 in FIG. 1. Each sample period or sector is then taken separately, the first sample period having a serial number N set equal to one. In step 44 the FFT for this two-second sample period is taken, to give the spectral energy distribution. In step 46 the maximum energy subband is selected and in step 48 a check is made to determine that the selected subband is suitable for the psycho-sensorial model. It may be for example that no curve of the type shown in FIG. 2 is available for that subband. If this is the case, the routine returns to step 46 and selects the next subband. The routine then moves to step 50 where the psycho-sensorial model is inspected and a determination made of the desired frequency and amplitude of the noise or degrade signal. In step 52 a check is made to ensure that this choice is suitable for the recording model, that is that the recording model can produce the desired noise at this frequency. If not, the routine returns to step 50. Assuming all is well, in step 54 the critical band for the desired playback noise is determined in the manner indicated above, and in step 56 the content of this noise is taken and presented in frequency-domain format. The next step 58 calculates the required anti-copy signal having regard to the assumed tape recorder response, and in step 60 the resultant timevarying anti-copy signal is generated. This is then inserted in the audio signal in step 62. The routine finally checks whether this is the last sample to be processed and on the assumption that it is not returns to step 44. The sample number N is incremented by one at step 66. If it is the final sample, the routine ends at step 68.

It will be appreciated that if assumptions are made that (i) once the subband of maximum audio signal amplitude has been found, then every time that subband is found to be the maximum the same noise signal is to be inserted, and (ii) the recording model held in circuit 13 does not vary, then the system can be greatly simplified since the elements 12, 13 and 14 can all be replaced by a single look-up table. However greater flexibility can be obtained by changing the anti-copy signal so that the noise content illustrated can be varied.

Figure 4:
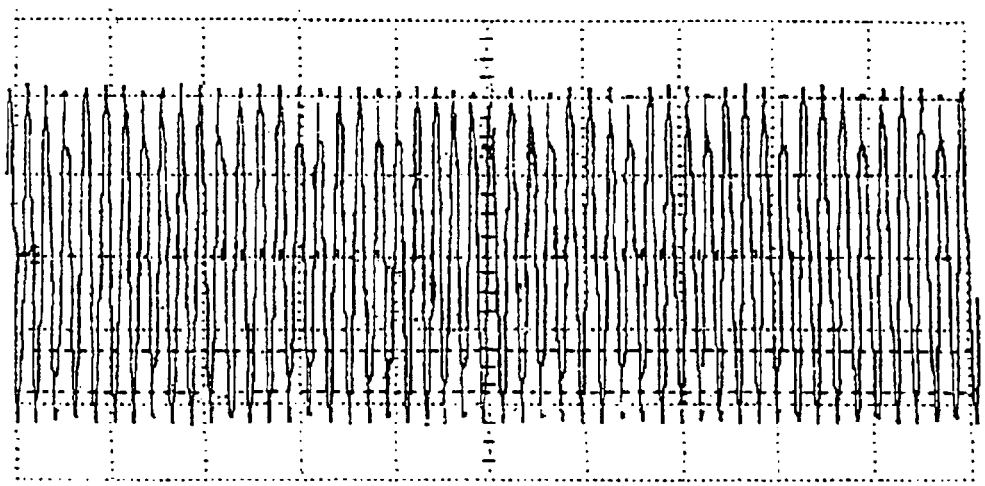
FIG. 4 shows at the output of the writing head circuit in a typical tape recorder in two situations, namely (a) when the signal to be recorded is zero and (b) when an anti-copy signal is added to the signal in (a)
Figure 4:
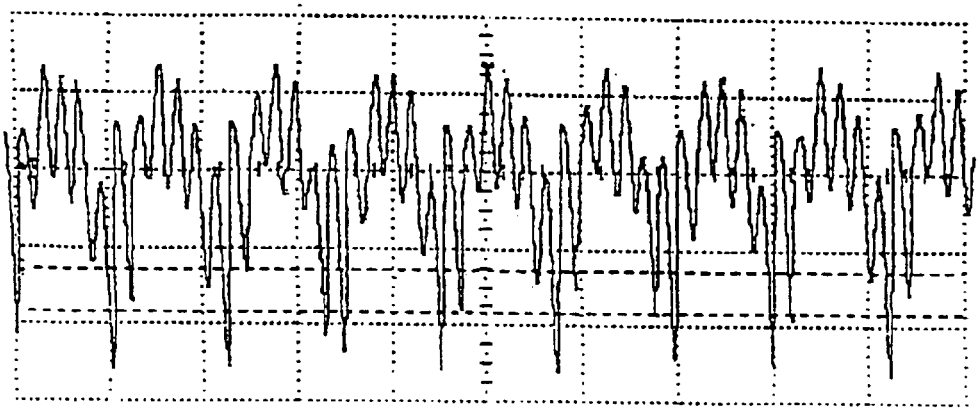

The effectiveness of the system illustrated will now be illustrated with reference to FIGS. 4 to 6. FIG. 4 shows at (a) an output waveform of the writing head circuit of a tape recorder when the recorded audio signal is zero. The bias oscillator component is clearly seen. At (b) is shown the corresponding waveform when an anti-copy signal is in use as supplied by the system of FIG. 1. It is seen that the waveform (b) is very different from the waveform (a), and is quite significantly distorted.

Figure 5:
FIG. 5 shows at (a) the waveform of a recorded audio signal and at (b) the waveform derived from the same signal when played back from an illegally-copied tape.

FIG. 5 shows two oscilloscope traces. The trace at (a) shows the waveform of a recorded audio signal, such as from a CD. The trace at (b) shows the waveform played back from an illegally-copied tape. Again, it is clear that the original material has been heavily distorted.

Figure 6:
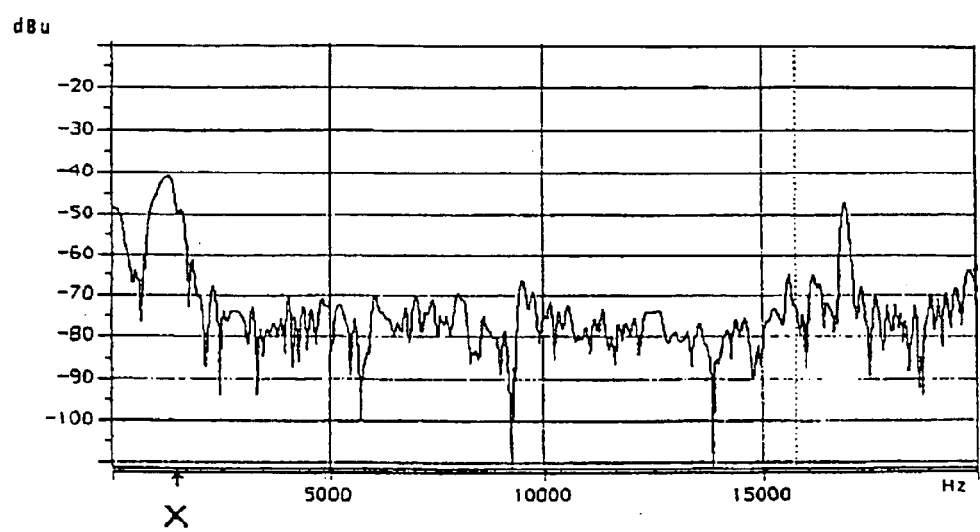
FIG. 6 shows the frequency spectrum of an audio signal played back from an illegally-copied tape.

Finally, FIG. 6 shows the spectrum of the audio signal played back from an illegal copy. In this case the predominant component of the original audio signal is at 80 Hz, right at the left-hand end of the figure. However, there is additionally a second pulse in the spectrum, produced as a result of the anti-copy signal, at around 1.5 KHz. This is marked X on FIG. 6.

The invention has been described by way of example but it will be appreciated that many modifications may be made to the system illustrated. For instance, while the invention has been described in the context of audio recordings the principles can be employed in relation to other programme signals, such as video signals, multimedia signals, and broadcast sound and/or vision signals. The principles can be applied analogously to the picture components of such signals rather than to the audio components. In any event the original programme signal includes an anti-copy signal which is adaptively dependent upon a frequency-dependent characteristic of the programme material.

What is claimed is:

1. A method of modifying a programme signal to provide protection against copying on a magnetic tape recorder, the method comprising the steps of:
   receiving a programme signal;
   frequency analysing the programme signal to determine at least one frequency-dependent characteristic of the programme signal;
   adaptively selecting a desired interference type in dependence upon the said characteristic;
   generating an anti-copy signal by the complex division:

$D(j\omega)=N(j\omega)/R(j\omega)$, where $D(j\omega)$ is the frequency-domain representation of the desired anti-copy signal to be generated; $N(j\omega)$ is the frequency-domain representation of the desired interference type to be produced on replay of an illegally-copied tape; and $R(j\omega)$ is the frequency-domain representation of an assumed tape recorder response; and by converting $D(j\omega)$ to the time domain; and
   adding to the programme signal the anti-copy signal to provide an output signal;
   wherein the anti-copy signal is such as to produce the desired interference when recorded on a tape recorder with a high-frequency writing head bias but is such as to be masked by the programme signal when the output signal is reproduced without being so recorded.

2. The method according to claim 1, in which the frequency analysing step comprises analysing the amplitude of the programme signal components in each of a plurality of subbands.

3. The method according to claim 1, in which the frequency analysing step comprises selecting the frequency component of greatest magnitude.

4. The method according to claim 1, in which the frequency analysing step comprises selecting the frequency component which masks the interference of greatest magnitude.

5. The method according to claim 1, in which the frequency analysing step comprises analysing the programme signal by way of a Fourier transform.

6. The method according to claim 1, in which the frequency analysing step comprises analysing the programme signal over a succession of sample periods.

7. The method according to claim 6, in which the sample periods are of duration 0.1 second to 10 seconds.

8. The method according to claim 1, in which the adaptively selecting step comprises selecting interference which is masked by a component of the programme signal in accordance with a psycho-sensorial model.

9. The method according to claim 1, in which the adaptively selecting step comprises determining the frequency and amplitude of the desired interference.

10. The method according to claim 1, in which the adaptively selecting step comprises selecting a verbal message to form the interference.

11. The method according to claim 1, in which the programme signal comprises an audio signal.

12. A programme signal produced by the method of claim 1.

13. A programme material product produced by the method of claim 1.

14. A method of modifying a programme signal to provide protection against copying on a magnetic tape recorder, the method comprising the steps of:
   receiving a programme signal;
   frequency analysing the amplitude of the programme signal components in each of a plurality of subbands;
   adaptively selecting the frequency component which can mask interference which is of the greatest magnitude;
   adaptively selecting a desired interference type in dependence upon the selected frequency component;
   generating an anti-copy signal in dependence on the desired interference type and on the assumed response of a tape recorder; and
   adding to the programme signal the anti-copy signal to provide an output signal;
   wherein the anti-copy signal is such as to produce the desired interference when recorded on a tape recorder with a high-frequency writing head bias but is such as to be masked by the programme signal when the output signal is reproduced without being so recorded.

15. An apparatus for modifying a programme signal to provide protection against copying on a magnetic tape recorder, the apparatus comprising:
   means for receiving a programme signal;
   frequency analysis means coupled to the receiving means for frequency analysing the programme signal to determine at least one frequency-dependent characteristic of the programme signal;
   adaptive selection means coupled to the frequency analysis means for adaptively selecting a desired interference type in dependence upon the said characteristic;
   generating means for forming an anti-copy signal by the complex division:

$D(j\omega)=N(j\omega)/R(j\omega)$, where $D(j\omega)$ is the frequency-domain representation of the desired anti-copy signal to be generated; $N(j\omega)$ is the frequency-domain representation of the desired interference type to be produced on replay of an illegally-copied tape; and $R(j\omega)$ is the frequency-domain representation of an assumed tape recorder response; and for converting $D(j\omega)$ to the time domain; and combining means coupled to the generating means for adding to the programme signal an anti-copy signal which is dependent upon the desired interference type to provide an output signal;

wherein the combining means adds an anti-copy signal such as to produce the desired interference when recorded on a tape recorder with a high-frequency writing head bias but such as to be masked by the programme signal when the output signal is reproduced without being so recorded.

16. The apparatus according to claim 15, in which the frequency analysis means comprises means for analysing the amplitude of the programme signal components in each of a plurality of subbands.

17. The apparatus according to claim 15, in which the frequency analysis means comprises means for selecting the frequency component of greatest magnitude.

18. The apparatus according to claim 15, in which the frequency analysis means comprises means for selecting the frequency component which masks the interference of greatest magnitude.

19. The apparatus according to claim 15, in which the frequency analysis means comprises means for analysing the programme signal by way of a Fourier transform.

20. The apparatus according to claim 15, in which the frequency analysis means comprises means for analysing the programme signal over a succession of sample periods.

21. The apparatus according to claim 15, in which the sample periods are of duration 0.1 second to 10 seconds.

22. The apparatus according to claim 15, in which the adaptive selection means comprises means for selecting interference which is masked by a component of the programme signal in accordance with a psycho-sensorial model.

23. The apparatus according to claim 15, in which the adaptive selection means comprises means for determining the frequency and amplitude of the desired interference.

24. The apparatus according to claim 15, in which the adaptive selection means comprises means for selecting a verbal message to form the interference.

25. An apparatus for modifying a programme signal to provide protection against copying on a magnetic tape recorder, the apparatus comprising:

means for receiving a programme signal;

frequency analysis means coupled to the receiving means for frequency analysing the amplitude of the programme signal components in each of a plurality of subbands;

adaptive selection means coupled to the frequency analysis means for adaptively selecting the frequency component that can mask interference which is of the greatest magnitude and for adaptively selecting a desired interference type in dependence upon the selected frequency component;

generating means, coupled to the adaptive selection means, for generating an anti-copy signal in dependence on the desired interference type and on the assumed response of a tape recorder; and combining means, coupled to the generating means, for adding to the programme signal an anti-copy signal which is dependent upon the desired interference type to provide an output signal;

wherein the combining means adds an anti-copy signal such as to produce the desired interference when recorded on a tape recorder with a high-frequency writing head bias but such as to be masked by the programme signal when the output signal is reproduced without being so recorded.

26. A copy-protected signal containing an audio program, comprising:

a plurality of audio program signal components, each audio program signal component residing in a frequency subband associated with a psycho-sensorial model; and an anti-copy signal component based upon a selected one or more of said psycho-sensorial models, said anti-copy signal component not audibly interfering with the audio program when said copy-protected signal is played back on an intended player, but when said copy-protected signal is copied, and said copy of said copy-protected signal is played back, said anti-copy signal component audibly interferes with the audio program.

27. The copy-protected signal according to claim 26, wherein said anti-copy signal component is contained within one frequency sub-band.

28. The copy-protected signal according to claim 27, wherein said anti-copy signal component is based on said psycho-sensorial model associated with said one frequency sub-band.

29. The copy-protected signal according to claim 27, wherein said anti-copy signal component is contained within said frequency sub-band associated with said audio program signal component of greatest magnitude.

30. The copy-protected signal according to claim 29, wherein said plurality of audio program signal components are repeatedly analyzed over a series of sample periods and said one or more psycho-sensorial models are selected for each sample period.

31. A method of producing a copy-protected signal containing an audio program, comprising the steps of:

providing a plurality of audio program signal components, each signal component residing within a frequency sub-band associated with a psycho-sensorial model;

generating an anti-copy signal component based upon a selected one or more of said psycho-sensorial models, said anti-copy signal component not audibly interfering with the audio program when said copy protected signal is played back on an intended player, but when said copy-protected signal is copied, and said copy of said copy of said copy-protected signal is played back, said anti-copy signal component audibly interferes with the audio program; and recording said plurality of audio program signal components and said anti-copy signal component onto a recordable medium.

* * * * *